(12) United States Patent
Ania Castañón et al.

(10) Patent No.: US 12,438,331 B2
(45) Date of Patent: Oct. 7, 2025

(54) SYSTEM AND METHOD FOR GENERATING HIGH-POWER ULTRA-SHORT PULSES IN LASERS

(71) Applicant: CONSEJO SUPERIOR DE INVESTIGACIONES CIENTÍFICAS, Madrid (ES)

(72) Inventors: Juan Diego Ania Castañón, Madrid (ES); Francesca Gallazzi, Madrid (ES)

(73) Assignee: CONSEJO SUPERIOR DE INVESTIGACIONES CIENTÍFICAS, Madrid (ES)

( * ) Notice: Subject to any disclaimer, the term of this patent is extended or adjusted under 35 U.S.C. 154(b) by 902 days.

(21) Appl. No.: 17/624,740

(22) PCT Filed: Jul. 3, 2020

(86) PCT No.: PCT/ES2020/070430
§ 371 (c)(1),
(2) Date: Jan. 4, 2022

(87) PCT Pub. No.: WO2021/001591
PCT Pub. Date: Jan. 7, 2021

(65) Prior Publication Data
US 2022/0247144 A1   Aug. 4, 2022

(30) Foreign Application Priority Data
Jul. 4, 2019 (ES) ................ ES201930623

(51) Int. Cl.
*H01S 3/067* (2006.01)
*H01S 3/10* (2006.01)
*H01S 3/30* (2006.01)

(52) U.S. Cl.
CPC ...... *H01S 3/06791* (2013.01); *H01S 3/06725* (2013.01); *H01S 3/10015* (2013.01); *H01S 3/302* (2013.01); *H01S 2301/085* (2013.01)

(58) Field of Classification Search
CPC ....... H01S 3/06791; H01S 3/085; H01S 3/302
See application file for complete search history.

(56) References Cited

U.S. PATENT DOCUMENTS

| | | | |
|---|---|---|---|
| 5,898,714 | A | 4/1999 | Morita et al. |
| 2005/0226278 | A1 | 10/2005 | Gu et al. |

(Continued)

FOREIGN PATENT DOCUMENTS

| | | |
|---|---|---|
| CN | 200983464 Y | 11/2007 |
| CN | 103956645 A | 7/2014 |

OTHER PUBLICATIONS

Alcon-Camas, "Long-distance soliton transmission through ultralong fiber lasers," 2009, Optics Lett., vol. 34, No. 20, p. 3104-3106. (Year: 2009).*

(Continued)

*Primary Examiner* — Michael Carter
(74) *Attorney, Agent, or Firm* — Maier & Maier, PLLC

(57) ABSTRACT

A system and method for generating ultra-short pulses intended to be inserted into a ring laser with a regulator of a pulsed signal of a certain intensity, the system includes an optical attenuator that allows the intensity of the pulsed signal to be adjusted at the input of an optical guide section, and a distributed amplification device inserted in the optical guide that make it possible to manage the power of the signal therein, so that it propagates as solitons or as self-similar pulses without suffering unwanted distortions despite the increase in the length of the laser cavity, increasing the power of the pulsed signal and making it possible to exceed the usual power limits of this type of laser.

13 Claims, 2 Drawing Sheets

(56) References Cited

U.S. PATENT DOCUMENTS

| | | | |
|---|---|---|---|
| 2006/0120418 A1 | 6/2006 | Harter et al. | |
| 2012/0275474 A1* | 11/2012 | Aguergaray | H01S 3/1112 372/18 |
| 2015/0030039 A1 | 1/2015 | Wise et al. | |
| 2019/0103722 A1 | 4/2019 | Kieu | |

OTHER PUBLICATIONS

Castellani, "Harmonic and single pulse operation of a Raman laser using graphene," 2012, Laser Phys Lett 9, p. 223-228. (Year: 2012).*

International Search Report issued on Oct. 14, 2020 in corresponding International application No. PCT/ES2020/070430; 9 pgs.

Alcon-Camas, M. et al.: "Long-distance soliton transmission through ultralong fiber lasers". Optics Letters, Oct. 15, 2009, vol. 34, N° 20, pp. 3104-3106 [on line][retrieved on Jul. 5, 2020]. see pp. 3104-3105.

Renninger, W.H. et al.: "High-Performance Fiber Lasers Based on Self-Similar Pulse Propagation". CLEO Europe/IQEC, Dec. 5, 2013, pp. 1 [on line][retrieved on Jul. 5, 2020].

Kobtsev, S. et al.: "Mode-locked fiber lasers with significant variability of generation regimes". Optical Fiber Technology, 2014, vol. 20, pp. 615-620 [on line] [retrieved on Jul. 5, 2020].

Kobtsev, S. et al.: "Ultra-low repetition rate mode-locked fiber laser with high-energy pulses". Optics Express, Dec. 22, 2008, vol. 16, N° 26, pp. 21936-21939 [on line] [retrieved on Jun. 5, 2020].

Office Action issued on Jan. 8, 2025, in corresponding Chinese Application No. 202080048951.X, 15 pages.

Office Action issued on Jan. 10, 2025, in corresponding Korean Application No. 10-2022-7003300, 11 pages.

Hasegawa, et al., "Optical Solitons in Fibers", Nonlinear Fiber Optics, Science Direct, 2003, 6th Edition, Chapter 5, pp. 41-59.

Agrawal, "Optical Solitons", Nonlinear Fiber Optics, Science Direct, 2013, Chapter 5, Section 5.2, pp. 129-191.

* cited by examiner

SYSTEM AND METHOD FOR GENERATING HIGH-POWER ULTRA-SHORT PULSES IN LASERS

FIELD

The main object of the present invention is a system and method for generating high-power ultra-short pulses in lasers. The system is based on increasing the length of the laser cavity or ring and the use of distributed amplification.

BACKGROUND

Today there are numerous applications for ultra-fast radiation sources, such as materials processing, telecommunications or tomography. This has led to the development of a large number of investigations related to this field.

Among the different options present for the implementation of ultra-fast sources, those based on mode locking stand out. A mode-locked laser uses any active technique, for example the use of modulators, or passive technique, such as the use of saturable absorbers, to force a regime in which a sequence of regularly spaced ultra-short pulses is emitted.

This type of configuration can be implemented, for example, in fibre optic laser systems that use a ring configuration, which enables the production of very short pulses, especially with locking in passive modes.

Among the possible configurations for the implementation of a saturable absorber in the laser device, a simple and efficient configuration is to use a semiconductor saturable absorber mirror. Over time, different materials and structures have been proposed as absorbers, such as for example graphene, carbon nanotubes, gold nanoparticles, black phosphorus or topological insulators, among others.

Fibre lasers combine stability, efficiency, compactness and easy integration, require minimal maintenance and enable manipulation of the output beam, making them attractive for a wide variety of applications.

Despite their advantages, the use of mode-locked ultra-fast fibre lasers is still restricted to certain areas, mainly due to the pulse energy and peak power achieved, which are limited in practice. This limitation hinders the use thereof in the processing of materials or industrial applications that require the use of very high powers. Therefore, solid-state lasers are normally used in these types of applications.

The most direct way to increase the pulse energy of mode-locked fibre lasers is to increase the length of the cavity, but the usual result of this method is the increase of the temporal width of the signal to the nanosecond range due to dispersive effects.

Although there have been recent developments of passive mode-locked fibre lasers capable of reaching peak powers to the order of megawatts from the use of photonic-crystal fibres, this goal seems unattainable using conventional low-cost communication fibre.

SUMMARY

The object of the present invention is a system and method for generating high-power ultra-short pulses in lasers preferably with a ring configuration, for use in applications such as material processing, super-continuous generation, sensing atmospheric gases or other applications that may benefit from the high power of the pulses.

The system comprises a series of components intended to be inserted into a laser, preferably a ring laser, which comprises a regulator of a pulsed signal of a certain intensity, the regulator being selected from a modulator or a saturable absorber, the system generating high-power ultra-short pulses in said ring laser.

In a mode-locked laser, the energy contained in the pulse depends directly on the length of the ring or the laser cavity without increasing the number of pulses simultaneously present in the cavity, meaning that an apparently simple way to achieve high-energy pulses could be to use very long cavities.

However, this is generally not possible, since in a cavity that is too long, the propagated pulses are distorted due to dispersive and non-linear effects, the latter being dependent on the intensity of the signal.

One way of controlling or even preventing this distortion consists of using a certain type of pulse, the solitonic pulses or solitons. Solitons are a type of solitary wave that propagates without losing its shape in a non-linear medium. This propagation without deformation is due to the fact that in solitons the dispersive and non-linear effects compensate each other, enabling them to propagate without distortion through a non-linear medium.

Another way of exercising control over this distortion to produce controlled deformations in the pulse consists of using certain combinations of dispersive and non-linear effects that give rise to the formation of so-called self-similar pulses, such as the so-called parabolic pulses that, although they widen in the time domain, they are susceptible to compression at the laser output.

However, the use of solitons or self-similar pulses raises another problem, since the transmission of the same requires the elimination or even local overcompensation of losses, something that is apparently unattainable for long distances, such as those that are necessary to achieve high-energy pulses, as indicated above.

To solve this problem, solutions have been proposed in recent years to maintain the power of the pulse transmitted along the fibre by means of Raman effect amplification, using a gain management system based on said amplification. This has been shown, for example, to enable the transmission of solitons over long distances without losses or distortions, as can be seen in the publication "*Long-distance soliton transmission through ultralong fiber lasers*" by M. Alcon-Camas, A. E El-Taher, H. Wang, P. Harper, V. Karalekas, J. A. Harrison, and J.-D. Ania-Castañón, Opt. Lett. 34, 3104-3106, 2009.

The system object of the invention, using the previous concepts, enables greater control to be exercised over the spatial distribution of the intensity, the non-linear effects and the dispersive characteristics of the signal inside the laser, being able to generate high-power pulsed signals with a lower cost and complexity than existing systems.

To do so, the system, which is inserted into the laser after the regulator, comprises an optical guide section (for example, an optical fibre section) inserted in the ring or laser cavity, such that the total length thereof is increased.

In order for the pulsed signal introduced in that optical guide section to meet the necessary balance between duration and power that enables a self-similar pulse generator signal to be generated, the system also comprises an optical attenuator that allows the intensity of the pulsed signal to be adjusted so that it acquires the necessary characteristics before propagating through the optical guide.

In different embodiments of the invention, the pulsed signal can be of the solitonic type, or any type of self-similar pulse, for example parabolic or triangular pulses.

Lastly, and in order for the optical guide section, the length of which can vary from hundreds of metres to hundreds of kilometres, to enable the controlled formation and propagation of solitons or self-similar pulses, the system comprises a gain management device, such as, for example, a distributed amplification device by means of Raman effect, inserted in the optical guide, which allows the intensity of the signal along the optical guide to be controlled.

This amplification device can be a system similar to that which is described in the publication "*Long-distance soliton transmission through ultralong fiber lasers*", mentioned above, or any other distributed amplification system. At the output of this amplified optical guide section, a second attenuator can be added to reduce, if necessary, the power of the pulse before it continues to travel through the ring laser.

Using solitonic pulses makes it possible to increase the length of the ring or laser cavity without having a negative impact on the shape and duration of the signal pulses of the laser. That is, the pulses, which can range from nanoseconds to attoseconds, propagate through rings of increased length without increasing their duration, such that the energy thereof is also increased.

In relation to the method for generating high-power ultra-short pulses in lasers, it uses the system described above, and comprises a first step of determining the duration and energy of the pulsed signal of the laser, in order to know the starting pulses that are going to be worked with.

Next, the intensity that the pulsed signal must reach in order to be transmitted as a signal that generates solitons or self-similar pulses is estimated, and the type of optical guide necessary in order for the signal to generate solitons or self-similar pulses is selected.

The intensity of the pulsed signal is then adjusted in the optical attenuator so as to coincide with that required for the signal to enter the optical guide as a signal that generates solitons or self-similar pulses, and the signal is then transmitted through said optical guide.

Inside the optical guide, the distributed amplification is used to control the intensity of the signal by means of the distributed amplification device. Lastly, part of the ultra-short pulsed signal generated in the laser is extracted. Based on this signal it is possible to more precisely adjust the distributed amplification system to achieve the generation of pulses with the desired characteristics.

In the event that the pulsed signal is of the solitonic type, the optical guide section must have the adequate dispersive characteristics to withstand the transmission of solitons, and the amplification system must limit the variation of the intensity of the signal with the distance travelled to maintain the soliton transmission conditions.

With another type of self-similar pulse, the required dispersive characteristics of the guide may be different and the distributed amplification system may offer a monotonous change in intensity with distance.

In all cases, the adjustment of the intensity of the signal in the optical attenuator depends on the dispersive and non-linear characteristics of the optical guide, and the step of selecting the type of optical guide also comprises determining the length thereof.

In this way, based on the system and method described, it is possible to overcome the drawbacks of power limitation previously raised with a compact, flexible, reliable and low-cost system that can be used in applications that require narrow pulses with high power and energy.

BRIEF DESCRIPTION OF THE DRAWINGS

To complement the present description, and for the purpose of helping to make the features of the invention more readily understandable, in accordance with a preferred practical exemplary embodiment thereof, said description is accompanied by a set of drawings constituting an integral part of the same, which by way of illustration and not limitation represent the following.

DETAILED DESCRIPTION OF THE EMBODIMENTS

In view of the figures described above, an exemplary embodiment of the system (1) for generating high-energy ultra-short pulses can be observed, intended to be inserted into a ring laser (10) comprising a regulator (7) of a pulsed signal of a certain intensity, the system (1) being inserted after the regulator (7).

Figure 1:
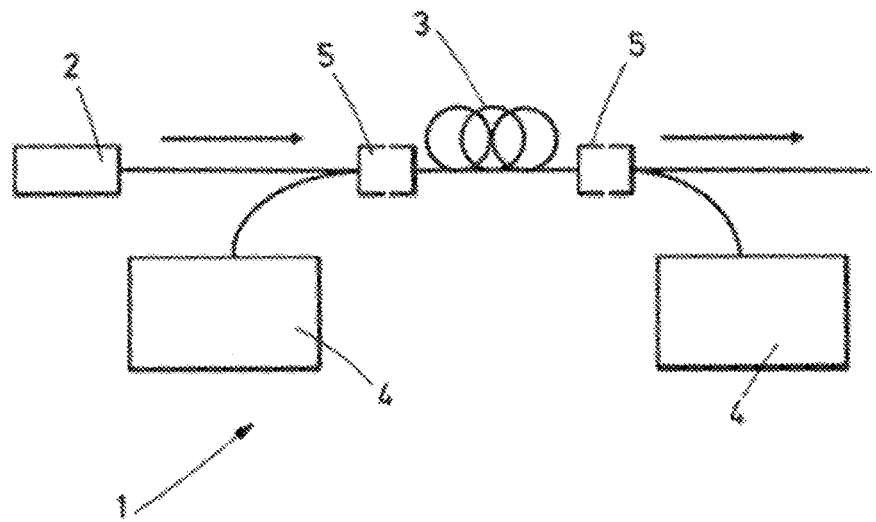
FIG. 1 shows a first embodiment of the system for generating high-energy ultra-short pulses.

The system (1), shown in FIG. 1, comprises an optical attenuator (2) that allows the intensity of the pulsed signal to be adjusted before it is introduced into a long optical guide section (3), positioned after the optical attenuator (2), through which the signal is transmitted.

The guide section (3) is a fibre with a length comprised between hundreds of metres and kilometres, depending on the energy of the pulsed signal to be achieved. The optical attenuator (2) adjusts the intensity of the pulsed signal at the input of the optical guide (3), which has a distributed amplification device based on the Raman effect integrated therein, which makes it possible to manage the intensity of the signal throughout the propagation thereof, allowing the pulsed signal to be transmitted through it as solitons or self-similar pulses without unwanted distortions.

The amplification device comprises one or more continuous wave lasers (4) positioned at one or both ends of the optical guide (3), which introduce a signal at the wavelengths required to produce Raman amplification, to the optical guide (3) from one or both ends.

The amplification device can also comprise a variable number of reflectors (5), which can be based on fibre Bragg gratings, and which, if included, are located between the continuous wave lasers (4) and the optical guide. The direction of light propagation in FIG. 1 is indicated by the arrows.

Figure 2:
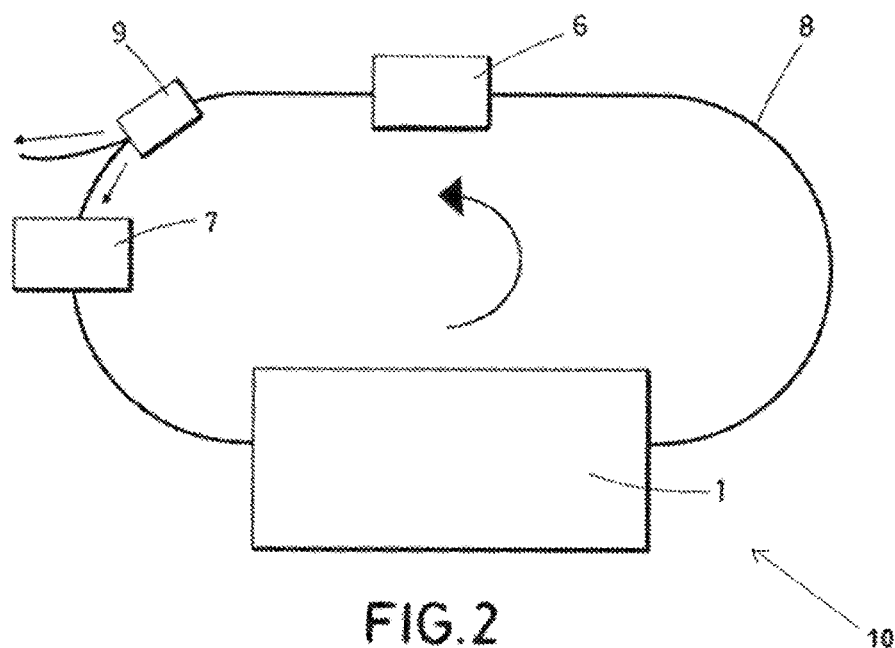
FIG. 2 shows an embodiment of the system inserted into a ring laser.

As reflected in FIG. 2, the system (1) is inserted or connected in a pulsed laser (10) with a ring configuration that further comprises an amplification device (6), a saturable absorber (7) or modulator that acts as a generator of a pulsed signal, and that can operate in a transmission or mirror configuration, and that enables the formation of an ultra-short pulsed signal that will propagate through a second optical guide section (8) that connects all the components of the laser and in which the proposed system (1) is inserted.

The laser (10) also comprises a signal splitter (9), which enables the extraction of part of the signal generated in the laser (10) while the rest continues to circulate inside the laser ring (10). The direction of light circulation in FIG. 2 is indicated by the arrows.

This pulsed laser (10) can also comprise a multitude of additional components, including, but not limited to: connectors, isolators, polarisers, frequency filters, diffraction gratings, signal spreading, amplifying and compressing systems (chirped-pulse-amplification), without the presence of said components affecting the proposed system (1), shown in FIG. 1.

Figure 3:
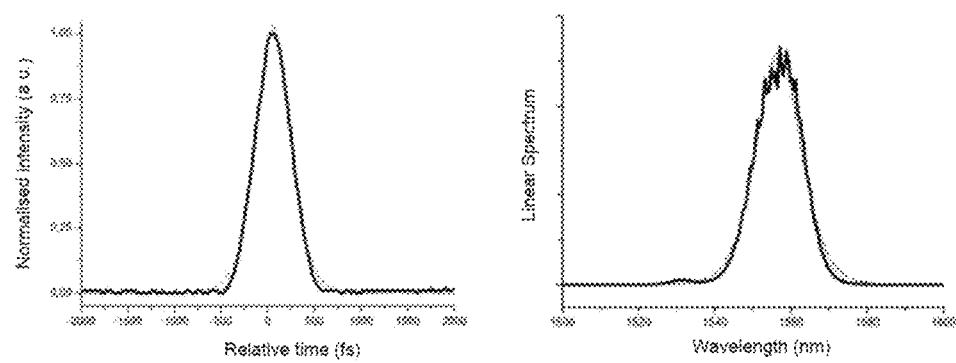
FIG. 3 shows an experimental profile of temporal autocorrelation and frequency spectrum of the pulses obtained in a femtosecond ring fibre laser with the preferred embodiment of the invention.

FIG. 3 shows the experimental profile of temporal autocorrelation and frequency spectrum of the pulses obtained in a femtosecond ring fibre laser with the preferred embodiment of the invention, adding a 10 km fibre section and a distributed Raman amplification system similar to that described in the publication "*Long-distance soliton transmission through ultralong fiber lasers*".

The dashed line represents numerical settings showing that the characteristics of a pulse of the obtained pulsed signal are similar to those of a soliton. The peak power of the pulse is greater than 0.6 MW and the duration of the same of about 350 fs, well above what has hitherto been achievable by a conventional fibre ring laser system without an external amplification system.

Furthermore, the method for generating high-power ultrashort pulses in lasers uses the system (1) described above, and comprises a first step of determining the duration and energy of the pulsed signal of the laser (10), to know what type of signal is going to be worked with.

Next, the intensity that the pulsed signal must reach in order to be transmitted as solitons is estimated, and the type of optical guide (3) necessary in order for the pulsed signal to be of the solitonic type is further selected.

The next step consists of adjusting the intensity of the pulsed signal in the optical attenuator (2) so as to coincide with that required for the solitonic pulsed signal to enter the optical guide (3). Once the intensity has been adjusted, the signal is transmitted through the optical guide (3).

Inside the optical guide, by means of the distributed amplification device, the Raman amplification of the signal is used to control the intensity thereof. Lastly, part of the ultra-short pulsed signal generated in the laser (10) is extracted for the use thereof.

The invention claimed is:

1. A laser having a laser cavity comprising: a regulator of a pulsed signal selected from a modulator or a saturable absorber and comprising a system for generating pulses having a peak power greater than 0.6 megawatts and a duration of less than 1 picosecond, located within the laser cavity and positioned after the regulator with respect to the direction of light propagation, the laser comprising:
   an adjustable optical attenuator;
   an optical guide through which the signal is transmitted and configured to increase the length of the laser cavity, the optical guide positioned after the optical attenuator with respect to the direction of light propagation; and
   a distributed amplification device based on the Raman effect, located within the optical guide and configured to regulate intensity of the signal that propagates through the optical guide;
   wherein the optical attenuator is configured to adjust the intensity of the pulsed signal prior to entry into the optical guide such that it coincides with that required for the pulsed signal to enter the optical guide as a signal that generates solitons.

2. The laser of claim 1, wherein the pulsed signal is a solitonic type.

3. The laser of claim 1, wherein the pulsed signal is parabolic.

4. The laser of claim 1, wherein the pulsed signal is triangular.

5. The laser of claim 1, wherein the laser is a ring laser.

6. The laser of claim 1, wherein the optical guide is an optical fibre.

7. The laser of claim 1, wherein the distributed amplification device based on the Raman effect comprises at least one continuous wave laser positioned at one end of the optical guide, which introduces a signal inside said optical guide, and that operates at the wavelengths required to produce Raman amplification.

8. The laser of claim 7, wherein the distributed amplification device comprises at least two continuous wave lasers to introduce signals from both ends of the optical guide.

9. The laser of claim 8, further comprising at least one reflector positioned between any of the continuous wave lasers and the optical guide.

10. The laser of claim 1, wherein the optical guide is of a length between 100 metres and 1000 kilometres.

11. A method for generating high-power ultra-short pulses in lasers, using the laser of claim 1, comprising:
    determining the duration and energy of the pulsed signal of the laser before it enters the system,
    estimating the intensity that the pulsed signal must reach in order to be a signal that generates solitonic or self-similar pulses,
    selecting the type of optical guide necessary for the signal to be a generator of solitonic or self-similar pulses,
    adjusting the intensity of the signal in the optical attenuator so as to coincide with that required for it to enter the optical guide as a signal that generates solitonic or self-similar pulses,
    transmitting the signal through the optical guide,
    controlling the intensity of the signal in the optical guide by means of the distributed amplification device, and
    extracting part of the ultra-short pulsed signal generated in the laser.

12. The method of claim 11, wherein the pulsed signal is a solitonic type.

13. The method of claim 11, wherein the pulsed signal is parabolic or triangular, and wherein the adjusting of the intensity of the signal at the optical attenuator further comprises adjusting the amplitude of the signal in order for the intensity of the signal to be constant.

* * * * *